(12) United States Patent
Lee et al.

(10) Patent No.: US 8,396,486 B2
(45) Date of Patent: Mar. 12, 2013

(54) METHOD OF INITIAL ACCESS IN A WIRELESS COMMUNICATION SYSTEM

(75) Inventors: Jin Lee, Gyeonggi-do (KR); In Uk Jung, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/127,032

(22) PCT Filed: Oct. 29, 2009

(86) PCT No.: PCT/KR2009/006284
§ 371 (c)(1),
(2), (4) Date: May 2, 2011

(87) PCT Pub. No.: WO2010/050756
PCT Pub. Date: May 6, 2010

(65) Prior Publication Data
US 2011/0201311 A1 Aug. 18, 2011

Related U.S. Application Data

(60) Provisional application No. 61/109,896, filed on Oct. 30, 2008, provisional application No. 61/120,482, filed on Dec. 7, 2008, provisional application No. 61/244,452, filed on Sep. 22, 2009.

(30) Foreign Application Priority Data

| Apr. 7, 2009 | (KR) | 10-2009-0029859 |
| Jul. 6, 2009 | (KR) | 10-2009-0061198 |
| Oct. 9, 2009 | (KR) | 10-2009-0096229 |

(51) Int. Cl.
*H04W 88/02* (2009.01)
(52) U.S. Cl. ................................................... 455/456.1
(58) Field of Classification Search ............... 455/456.1, 455/41.2, 411, 435.2, 458, 422.1, 450, 525, 455/436–444; 370/331, 329
See application file for complete search history.

(56) References Cited

U.S. PATENT DOCUMENTS

| 7,929,970 | B1 * | 4/2011 | Gunasekara et al. ......... 455/444 |
| 2007/0097938 | A1 | 5/2007 | Nylander et al. |
| 2007/0243872 | A1 | 10/2007 | Gallagher et al. |
| 2007/0254620 | A1 | 11/2007 | Lindqvist et al. |
| 2008/0153497 | A1 | 6/2008 | Kalhan |
| 2010/0112980 | A1 * | 5/2010 | Horn et al. ..................... 455/411 |
| 2011/0149878 | A1 * | 6/2011 | Ahmadi et al. ................ 370/329 |
| 2012/0252435 | A1 * | 10/2012 | Bienas et al. .............. 455/422.1 |

FOREIGN PATENT DOCUMENTS

| JP | 2003518889 | 6/2003 |
| WO | 2007/040454 | 4/2007 |

* cited by examiner

*Primary Examiner* — Diane Mizrahi
(74) *Attorney, Agent, or Firm* — Lee, Hong, Degerman, Kang & Waimey (57) ABSTRACT

A method of initial access in a wireless communication system is disclosed. A method of initial access of a mobile station in a wireless communication system with femtocells comprises selecting a base station to which the mobile station requests information of femto cell base stations which can serve the mobile station and exist around the mobile station through scanning downlink channel; and requesting the selected base station the information of the femto cell base stations.

13 Claims, 11 Drawing Sheets

METHOD OF INITIAL ACCESS IN A WIRELESS COMMUNICATION SYSTEM

CROSS-REFERENCE TO RELATED APPLICATIONS

This application is a 371 U.S. national stage application of International Application No. PCT/KR2009/006284, filed on Oct. 29, 2009, which claims priority to Korean Application Nos. 10-2009-0096229, filed on Oct. 9, 2009, 10-2009-0061198, filed on Jul. 6, 2009, and 10-2009-0029859, filed on Apr. 7, 2009, and U.S. Provisional Application Ser. Nos. 61/244,452, filed on Sep. 22, 2009, 61/120,482, filed on Dec. 7, 2008, and 61/109,896, filed on Oct. 30, 2008, the contents of which are incorporated by reference herein in their entirety.

TECHNICAL FIELD

The present invention relates to a wireless communication system and more particularly to a method of initial access in a wireless communication system.

BACKGROUND ART

Figure 1:
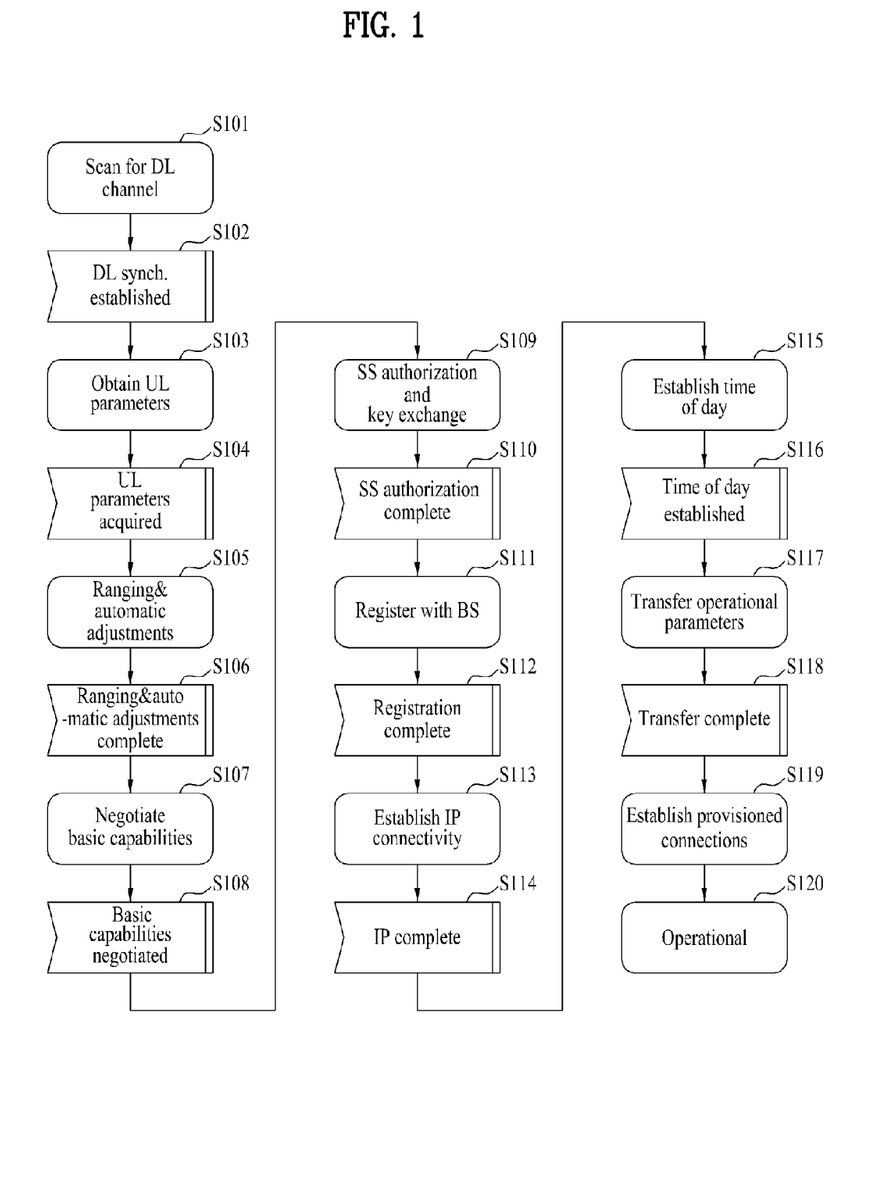
FIG. 1 illustrates a method of initial access in a wireless communication system according to related art.
Figure 2:
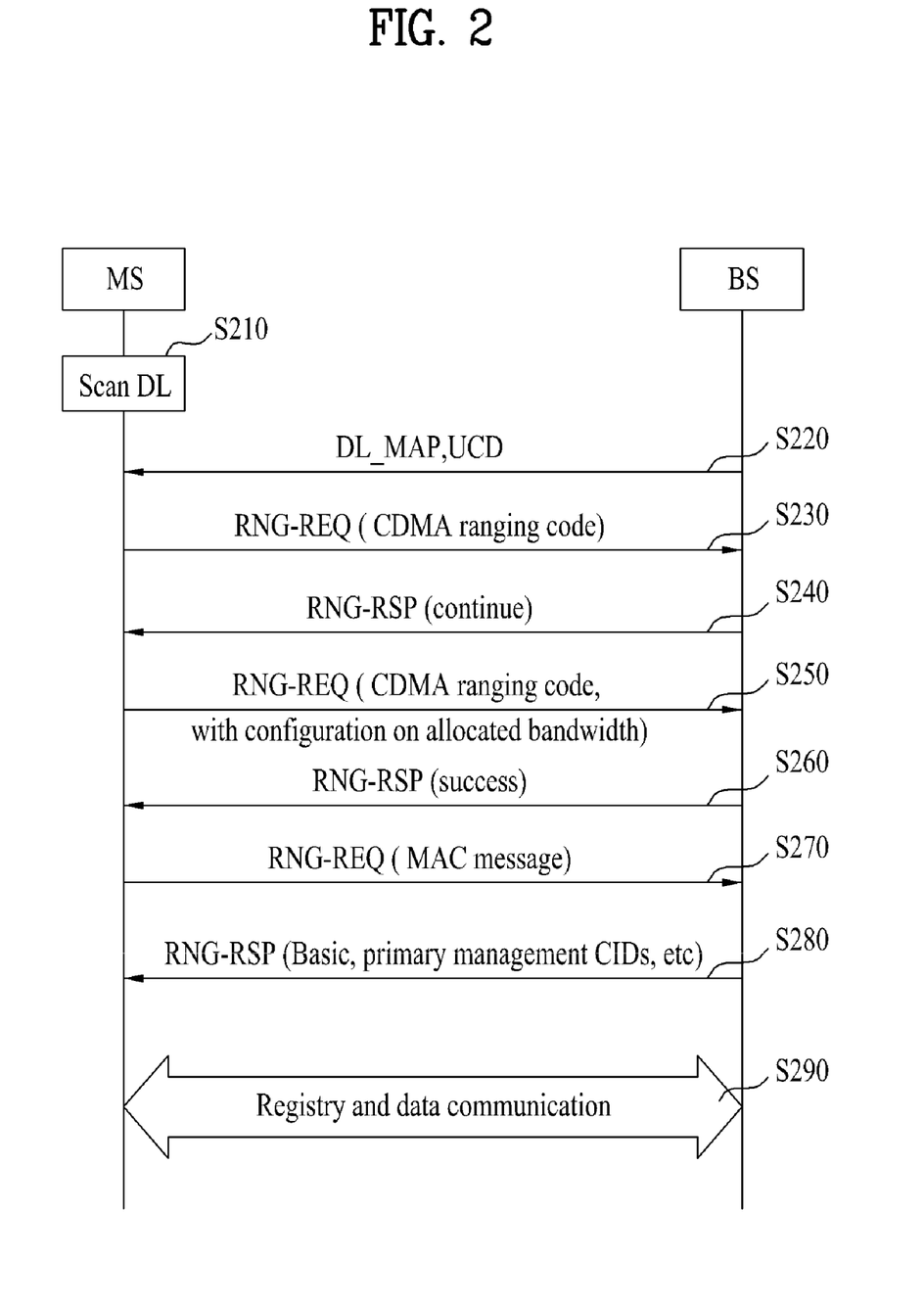
FIG. 2 illustrates ranging process between a mobile station and a base station in a wireless communication system according to related art.

A method of initial access in a wireless communication system according to related art will be described with reference to FIGS. 1 and 2. FIG. 1 illustrates a method of initial access in a wireless communication system according to related art. FIG. 2 illustrates ranging process between a mobile station and a base station in a wireless communication system according to related art.

As illustrated in FIG. 1, to perform initial access, a mobile station first scans downlink channel (FIG. 1, S101; FIG. 2, S210) and searches base stations which the mobile station is accessible to. At this time, the mobile station scans frequency of neighbor base stations one by one because having no information about network configuration.

And, after the mobile station acquires system information about downlink and uplink from the searched base station and completes system setting (FIG. 1, S102 to S104; FIG. 2, S220), the mobile station performs ranging process with the searched base station (FIG. 1, S105, S106; FIG. 2, S230, S240). The mobile station selects a CDMA ranging code and performs contention based ranging process with the base station and establishes synch (FIG. 1, S105, S106; FIG. 2, S250, S260, S270, S280).

Until synch is established, the base station informs the mobile station of values of parameters which must be corrected through ranging response (RNG-RSP) messages. While values of parameters are correcting, status of RNG-RSP messages is set to continue. And after correcting values of parameters is completed, status of RNG-RSP messages is set to success (FIG. 2, S240, S250, S260).

After synch is established, the mobile station registers in a wideband network and is served (FIG. 1, S107 to S120; FIG. 2, S290).

Delay of a method of initial access according to related art is not that long in a previous wireless communication system because number of base stations is not that large and type of base stations is one. But, as new types of base stations like femto cell base stations and relay base stations appear recently, delay is too long if a method of initial access according to related art is applied to a wireless communication system including new types of base stations. A method of initial access which is proper for new types of base stations becomes necessary.

First, there are transparent and non-transparent types in relay base stations, and it is determined which base station a mobile station transmits control signals to by the type of a relay base station.

A transparent relay base station exchanges user plane information with a mobile station and control signals are exchanged between a mobile station and a macro base station. that is, it is a centralized BS-oriented network.

A non-transparent relay base station exchanges user plane information and control signals with a mobile station. And it can be a centralized BS-oriented network or a distributed BS-oriented network.

A femto cell base station is a mini version of a macro base station and performs almost functions of a macro base station. A femto cell base station can be established in coverage of a macro base station or in area which is not covered by a macro base station. A femto cell base station has a network which operates independently. And a femto cell base station will be established in indoor or urban area far more than a relay base station. Thus, femto cell base stations are not included in a neighbor base station list which a base station transmits to a mobile station because overhead is too large.

Because there are too many femto cell base stations around a mobile station, delay becomes too long if a mobile station scans all of neighbor base stations when searching downlink channel like a method of initial access according to related art.

There are a select first and reject later method and a select right method in methods of initial access in a wireless communication system including femto cell base stations.

In a select first and reject later method, a mobile station scans downlink channel and tries ranging to a femto cell base station which is detected first. Then the femto cell base station checks whether the mobile station is accessible to itself and authenticated. If the mobile station is not accessible to itself or authenticated, the femto cell base station rejects the mobile station. The rejected mobile station scans downlink again and searches another femto cell base station and tries ranging to the searched femto cell base station. A select first and reject later method has a problem that delay of initial access is large because a mobile station repeats ranging until finding a femto cell base station which a mobile station is accessible.

In a select right method, a mobile station finds out a femto cell base station which a mobile station is accessible at once with a specific method. However, the specific method must be defined in a select right method.

DISCLOSURE

Technical Problem

As previously stated above, since femto cell base stations are too many and allow a mobile station to access restrictively, delay is too long according to the related art. And since femto cell base stations and macro base station coexist, which base station is scanned first must be decided. Thus, a method of initial access which is proper for a wireless communication system including femto cell base stations is necessary.

An object of the present invention is to provide an efficient method of initial access.

Another object of the present invention is to provide a method of initial access which reduces delay.

Technical subject matters to be realized by embodiments of the present invention are not limited to the above-mentioned technical subject matters, and other technical subject matters not mentioned in the above-mentioned description may be easily appreciated by those skilled in the art to which the present invention pertains without difficulty.

Technical Solution

In order to solve the above technical problems, a method of initial access of a mobile station in a wireless communication system with femtocells comprises selecting a base station to which the mobile station requests information of femto cell base stations which can serve the mobile station and exist around the mobile station through scanning downlink channel; and requesting the selected base station the information of the femto cell base stations.

Also, the method further comprises receiving the information of the femto cell base stations; scanning the femto cell base stations and searching an optimal femto cell base station; and performing initial access to the optimal femto cell base station.

Also, if the mobile station searches a femto cell base station and a macro base station which can send the information to the mobile station through the scanning downlink channel, the mobile station selects the femto cell base station as the base station to which the mobile station requests the information of the femto cell base stations.

Also, the selecting comprised receiving broadcast channels from neighbor base stations and each of the broadcast channels indicates whether each of the neighbor base stations can transmit the information of the femto cell base stations.

Also, the requesting comprises transmitting a query to request the information of the femto cell base stations to the selected base station.

Also, the method further comprises receiving a query response through first super frame from the selected base station wherein the query response includes super frame offset on which the information of the femto cell base stations will be transmitted.

Also, the method further comprises receiving a broadcast channel on second super frame which is distant the super frame offset from the first super frame from the selected base station; and receiving the information of the femto cell base stations on the second super frame.

Also, the information of the femto cell base stations includes at least on among base station ID of the femto cell base stations and information of frequency used by the femto cell base stations.

In order to solve the above technical problems, a method of transmitting information of femto cell base stations of a base station in a wireless communication system with femto cells comprises Receiving a request for information of femto cell base stations which can serve a mobile station and exist around the mobile station from the mobile station; and transmitting the information of the femto cell base stations to the mobile station.

Also, the method further comprises transmitting a broadcast channel indicates whether the base stations can transmit the information of the femto cell base stations.

In order to solve the above technical problems, a method of initial access of a mobile station in a wireless communication system with femtocells comprises transmitting an advanced air interface privacy key management request (AAI_PKM-REQ) message to request a femto cell base station to transmit information of neighbor femto cell base stations which can serve the mobile station if authentication is failed to the femto cell base station; and receiving the information of the neighbor femto cell base stations if the authentication is failed.

Also, the receiving comprises receiving the information of the neighbor femto cell base stations through an advanced air interface privacy key management response (AAI_PKM-RSP) message.

In order to solve the above technical problems, a method of initial access of a mobile station in a wireless communication system with femtocells comprises Performing authentication with a femto cell base station; and receiving information of neighbor femto cell base stations which can serve the mobile station if the authentication is failed from the femto cell base station.

Also, the method further comprises requesting the femto cell base station to transmit the information of the neighbor femto cell base stations if authentication is failed to the femto cell base station.

Also, the receiving comprises receiving the information of the neighbor femto cell base stations through an advanced air interface neighbor response (AAI_NBR-RSP) message.

Also, the receiving comprises receiving the information of the neighbor femto cell base stations through an advanced air interface privacy key management response (AAI_PKM-RSP) message including a code, which indicates that the AAI_PKM-RSP message provides the information of the neighbor femto cell base stations.

Advantageous Effects

According to the embodiments of the present invention, the following advantages can be obtained.

First of all, since a base station informs a mobile station of neighbor femto cell base stations which a mobile station is accessible to, a mobile station can perform initial access efficiently.

Second, since a mobile station scans only neighbor femto cell base station received by a base station, delay can be reduced.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

In the whole part of the specification of the present invention, if it is assumed that a certain part includes a certain component, the term 'including' means that a corresponding component may further include other components unless a specific meaning opposed to the corresponding component is written. In addition, another term ' . . . part', " . . . unit', 'module' or the like means a unit for processing at least one function or operation, and this unit may be implemented by hardware, software, or a combination thereof.

Figure 3:
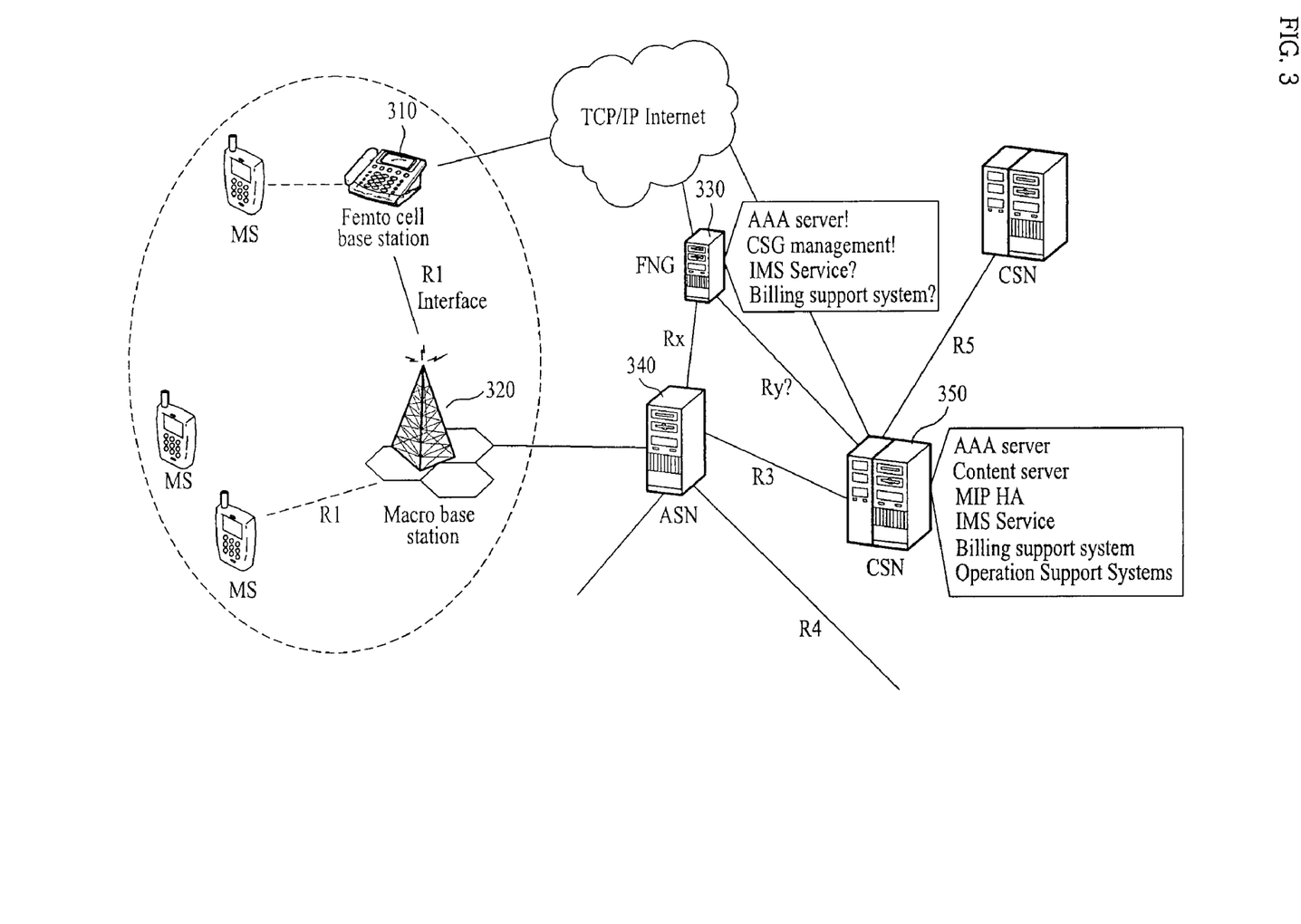
FIG. 3 is a schematic view illustrating a wireless communication system with femto cell base stations.

First, a wireless communication system with femto cell base stations will be described with reference to FIG. 3. FIG. 3 is a schematic view illustrating a wireless communication system with femto cell base stations.

Illustrated in FIG. 3, a wireless communication system with femto cell base stations comprises a femto cell base station 310, a macro base station 320, a femto network gateway (FNG) 330, an access service network (ASN) 340 and a connectivity service network (CSN) 350. A macro base station 320 is a general base station of a previous wireless communication system.

A femto cell base station 310 is a mini version of a macro base station and performs most functions of a macro base station. A femto cell base station 310 connects directly to a transmission control protocol/internet protocol (TCP/IP) network, operates independently like a macro base station 320. Coverage of a femto cell base station is about 0.1~30 m and a femto cell base station can accepts 10~20 mobile stations. Frequency used by a femto cell base station 310 can use same or different from that used by a macro base station 320.

A femto cell base station 310 connects to a macro base station 320 through R1 interface so to receive downlink channel from a macro base station 320 and transmit control signal to a macro base station 320.

A femto cell base station 310 can cover indoor or shadow area which a macro base station cannot cover and support high data rate transmission. A femto cell base station 310 can be established as overlay in macro cell area or as non-overlay in area which a macro base station does not cover.

In case that a femto cell base station is established as overlay in macro cell area, the femto cell base station is synchronized with a macro base station and can receive a downlink channel from the macro base station. And the macro base station can provides a mobile station with information of location of the femto cell base station. The femto cell base station provides its information to a macro base station through backhaul.

In case that a femto cell base station is established as non-overlay, the femto cell base station can use its own preamble set or connection identification (CID) and receive preambles or CID resources as centralized method from close macro base station. Or, it can acquire system information from close macro base station through backhaul.

There are two types of a femto cell base station 210. One type is a closed subscriber group (CSG) femto cell base station and another type is an open subscriber group (OSG) femto cell base station. A CSG femto cell base station groups mobile stations which is accessible to the CSG femto cell base station, grants the mobile stations CSG identification (ID) and allow the only mobile stations granted CSG ID to access to the CSG femto cell base station. An OSG femto cell base station is a base station which all mobile station can access.

A FNG 330 controls a femto cell base station 310 and connects to an ASN 340 and a CSN 350 through Rx and Ry interface respectively. A femto cell base station 310 can be served by a CSN 350 through a FNG 330. A mobile station connected to a femto cell base station 310 can be authenticated by a FNG 330 or a CSN 350.

A CSN 350 provides a mobile station authentication, charging function and an application service like internet and VoIP. And an ASN 340 controls a macro base station 320 and manages connection of a macro base station 320 and a CSN 350.

Figure 4:
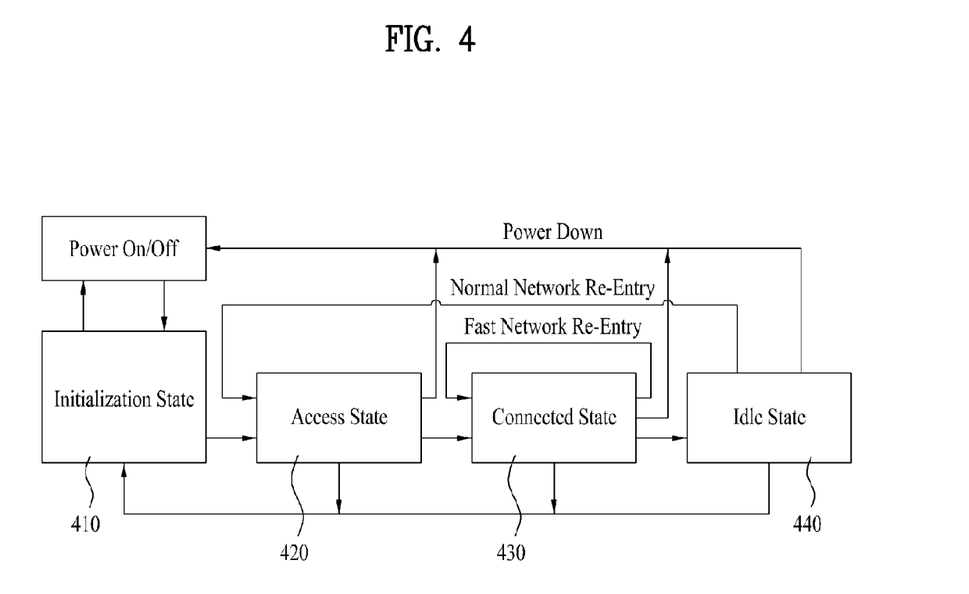
FIG. 4 illustrates status change of a mobile station.
Figure 5:
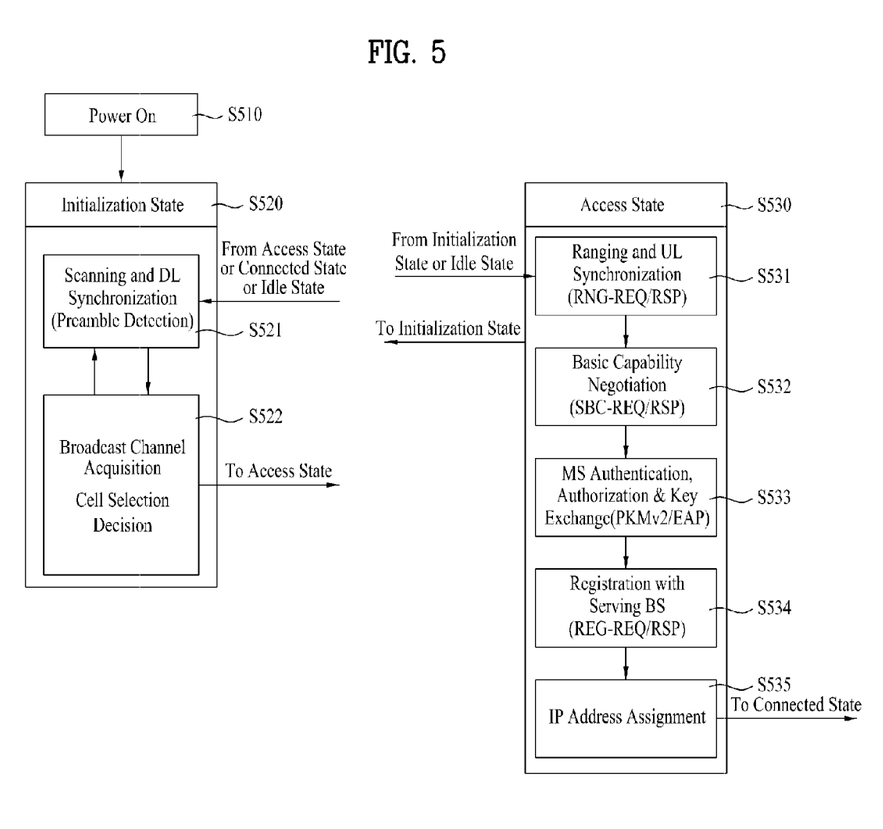
FIG. 5 illustrates initialization state and access state.

Next, status change of a mobile station will be described with reference to FIGS. 4 and 5. FIG. 4 illustrates status change of a mobile station. FIG. 5 illustrates initialization state and access state.

As illustrated in FIG. 4, status of mobile station is divided into initialization state 410, access state 420, connected state 430 and idle state 440. Initial access is related to initialization state and access state.

In initialization state, a mobile station scans downlink channels and searches base stations. And a mobile station acquires system information of searched base stations and decides a base station for access. A base station transmits system information like uplink channel descriptor (UCD) and downlink channel descriptor (DCD) every superframe of subframe so that initial access process could be performed quickly. Superframe is 20 ms and subframe is 0.617 ms.

As illustrated in FIG. 5, in access state, a mobile station performs ranging, authentication and registry with a base station to which the mobile station access and change into connected state (FIG. 5, S510, S520 to S522, S530 to S535).

Next, a method of initial access according to an embodiment of the present invention will hereinafter be described with reference to FIGS. 6 to 7.

Figure 6:
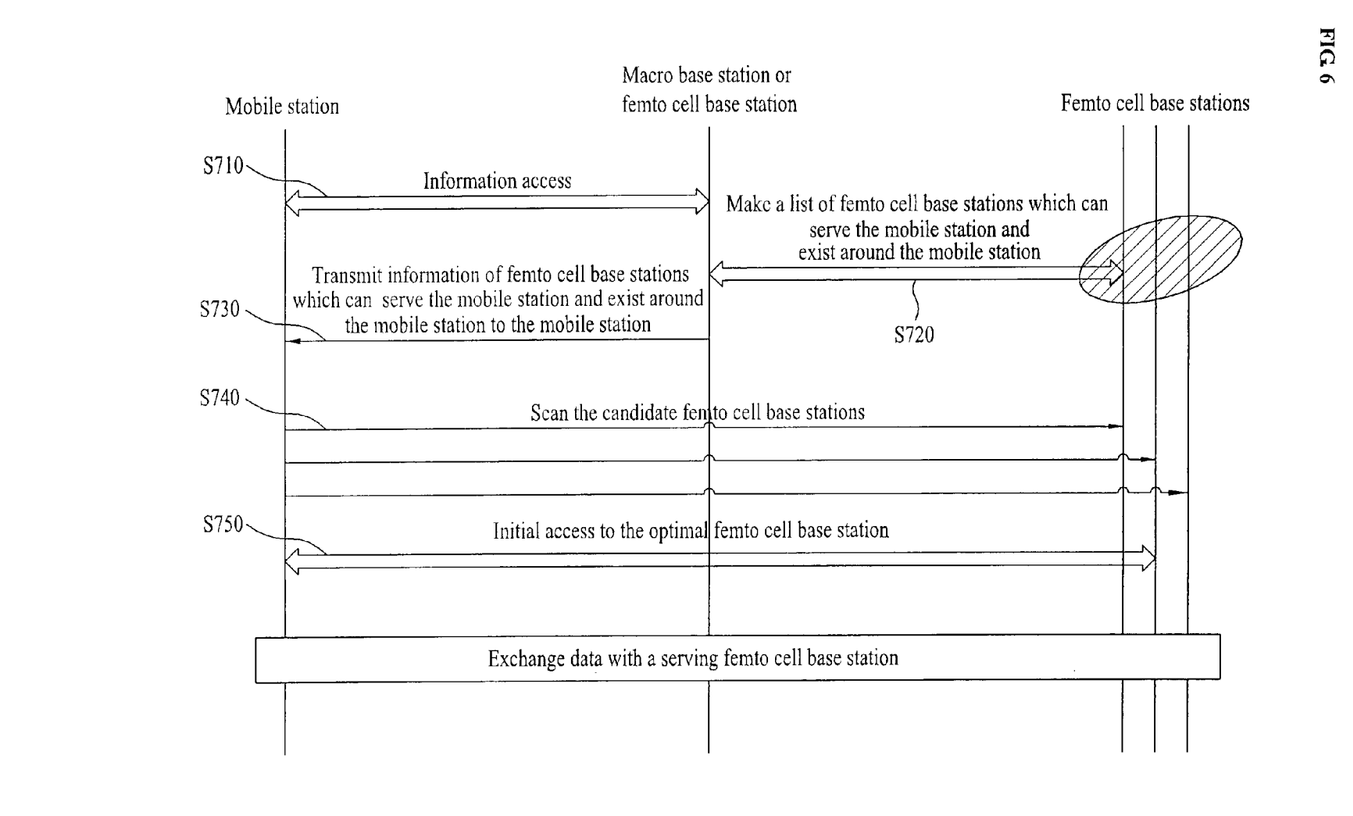
FIG. 6 illustrates a method of initial access according to an embodiment of the present invention.

FIG. 6 illustrates a method of initial access according to an embodiment of the present invention. FIG. 7 illustrates process which each object performs in a method of initial access according to an embodiment of the present invention.

In case that a mobile station performs initial access to a network after power of a mobile station is turned on or a mobile station in idle mode performs network reentry, a mobile station tries initial network entry.

In an embodiment of the present invention, a mobile station scans downlink channel and search base stations which can provide a mobile station with network configuration information. And it requests a searched base station information of femto cell base station which can serve the mobile station and exist around the mobile station. And it receives the information of the femto cell base station and scans the femto cell base stations and searches an optimal femto cell base station and performs initial access to the optimal femto cell base station.

A mobile station scans downlink channel and search a base station for information access. Information access is a procedure of requesting network configuration information after ranging between a mobile station and a base station.

During scanning downlink channel, a mobile station acquires cell ID of femto cell base station through primary synchronous channel (P-SCH) and secondary synchronous channel (S-SCH) and bearer connection capability and network information access capability through broadcast channel (BCH).

The bearer connection capability means a type of a femto cell base station in an embodiment of the present invention. There are OSG femto cell base stations and CSG femto cell base stations. Every mobile station can access OSG femto cell base stations and specific mobile stations can access CSG femto cell base stations. Thus, bearer connection capability of OSG femto cell base stations is on, and bearer connection capability of CSG femto cell base stations is off.

Information of the bearer connection capability can be transmitted through primary BCH or secondary BCH. In case that it is transmitted through secondary BCH, it is transmitted every superframe to prevent a mobile station which does not support CSG from receiving several BCHs.

The network information access capability is authority to acquire network configuration information from femto cell base station before registry to a network. The network information access capability is independent from the bearer connection capability.

A femto cell base station can informs a mobile station of the network information access capability and the bearer connection capability through cell ID or base station ID. For example, specific bits of cell ID or base station ID represent the network information access capability and the bearer connection capability respectively. Or, base station ID of a femto cell base station can be extended by 2 bits and one bit represents the bearer connection capability and another bit represents the network information access capability.

Result of scanning downlink channel is 3 kinds. That is, there are a case that only macro base stations are detected, a case that only femto cell base stations are detected and a case that macro base stations and femto cell base stations are detected. In case that only macro base stations are detected, a mobile station tries initial access to the macro base station.

In case that only femto cell base stations are detected or macro base stations and femto cell base stations are detected, a mobile station select a femto cell base station whose signal strength is best among detected femto cell base stations whose network information access capability is on for information access.

In case that macro base stations and femto cell base stations are detected, if there are no femto cell base stations which a mobile station can perform information access to among detected femto cell base stations, a mobile station tries to information access to a macro base station whose signal strength is best. And in case that only femto cell base stations are detected, a mobile station cannot access to network if all the detected femto cell base stations are CSG femto cell base stations, and a mobile station performs initial access to an OSG femto cell base station whose signal strength is best if there are OSG femto cell base stations among detected femto cell base stations.

Figure 7:
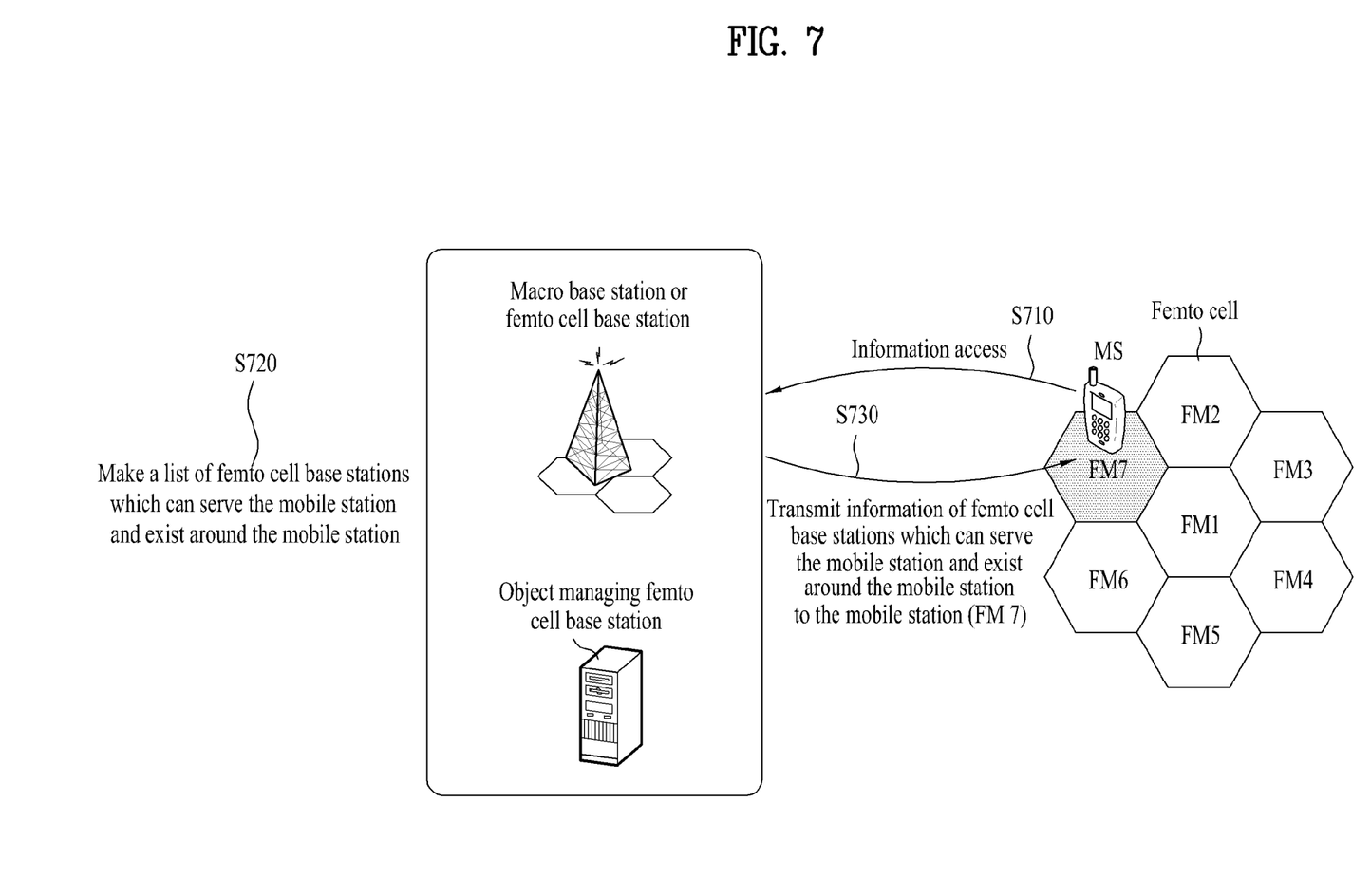
FIG. 7 illustrates process which each object performs in a method of initial access according to an embodiment of the present invention.

As illustrated in FIGS. 6 and 7, a mobile station performs initial access to a base station S710. During initial access, the mobile station transmits information of detected femto cell base stations to the base station.

During initial access, the mobile station performs ranging with the base station transmitting CADM code and requests information of femto cell base stations which can serve the mobile station and exist around the mobile station.

Then, the base station makes a list of femto cell base stations which can serve the mobile station and exist around the mobile station based on the information of detected femto cell base stations S720. When making the list, the base station can use information which the base station already knows or information received from femto cell base station management objects. On of femto cell base station management objects can be a FNG.

A base station transmits information of femto cell base stations which can serve the mobile station and exist around the mobile station to the mobile station S730. The information of femto cell base stations can include base station ID and central frequency of frequency band of the femto cell base stations.

A mobile station scans the femto cell base stations which can serve the mobile station and exist around the mobile station to the mobile station S740 and searches an optimal femto cell base station and performs initial access to the optimal femto cell base station S750.

In case that there are no the femto cell base stations which can serve the mobile station, a mobile station can not receive the femto cell base stations which can serve the mobile station and exist around the mobile station from the base station. In that case, a mobile station performs initial access to a macro base station if it detected a macro base station during scanning downlink channel, and a mobile station can not access to a network if it detected only femto cell base station during scanning downlink channel.

Next, procedure of transmitting and receiving messages between a mobile station and a base station in a method of initial access according to an embodiment of the present invention will be described with reference to FIG. 8.

Figure 8:
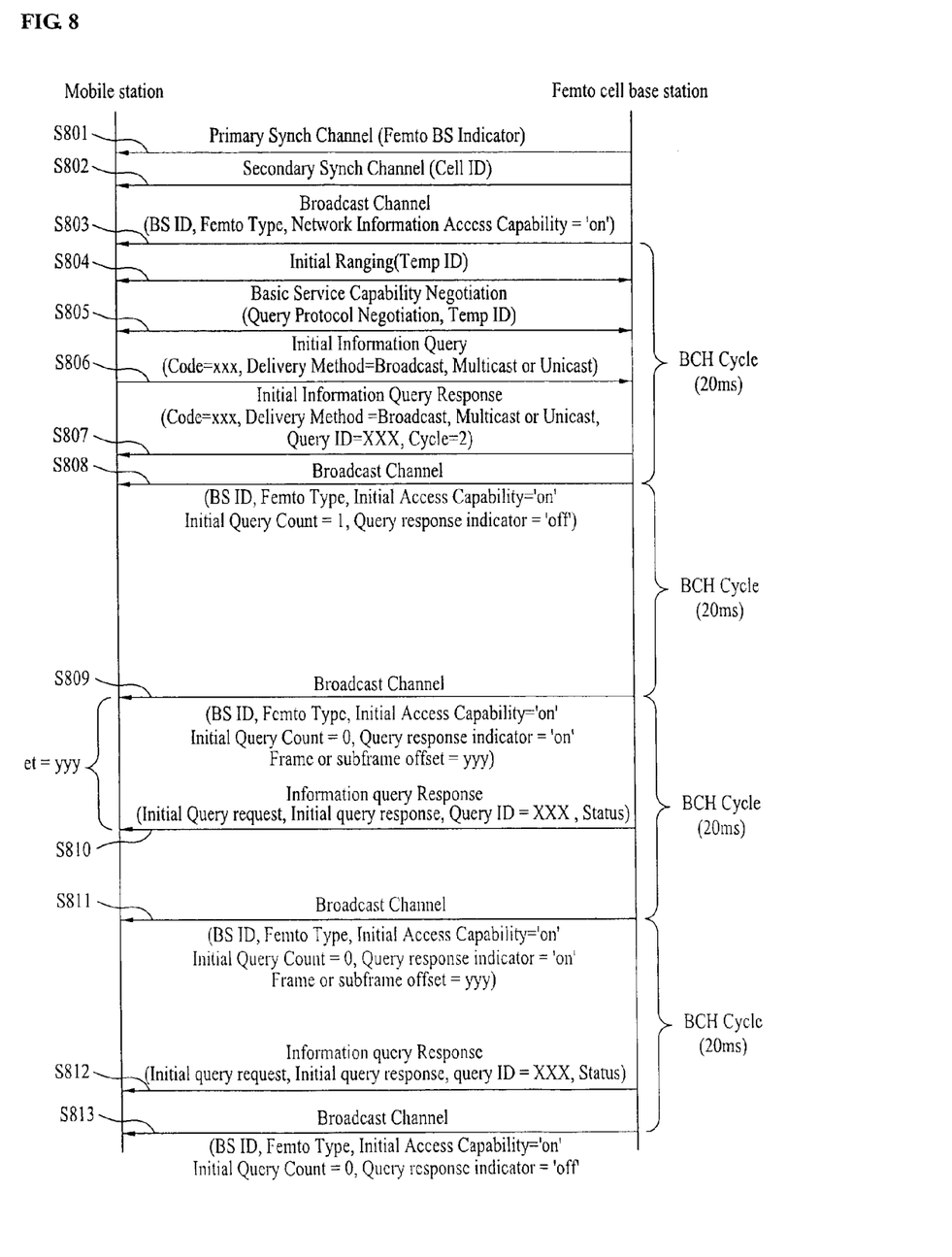
FIG. 8 illustrates procedure of transmitting and receiving messages between a mobile station and a base station in a method of initial access according to an embodiment of the present invention.

FIG. 8 illustrates procedure of transmitting and receiving messages between a mobile station and a base station in a method of initial access according to an embodiment of the present invention.

A mobile station first scans downlink channels. That is, the mobile station receives synch channels and broadcast channels form neighbor base stations. In FIG. 8, the mobile station receives a femto BS indicator through a primary synch channel S801 and a cell ID through a secondary synch channel S802. The mobile station becomes aware that a base station is a femto cell base station with a femto BS indicator.

The mobile station receives base station ID (BS ID), femto type and network information access capability through a broadcast channel S803. The femto type represents whether a base station is an OSG femto cell base station of a CSG femto cell base station. That network information access capability is on means a base station can provide the mobile station with network configuration information. That network information access capability is off means a base station cannot provide the mobile station with network configuration information.

The mobile station performs information access to a femto cell base station whose signal strength is best among femto cell base stations whose network information access capabilities are on. That is, as illustrated in FIG. 8, the mobile station performs initial ranging with the femto cell base station S804 and receives temp ID.

The mobile station performs basic service capability negotiation with the femto cell base station S805. At this time the mobile station negotiates query protocol which will be used until acquiring network configuration information with the femto cell base station. Since distance between the mobile station and the femto cell base station is short, initial ranging can be omitted. If initial ranging is omitted, the mobile station receives the temp ID during basic service capability negotiation. The temp ID is used for messages transmission until MAC address of a mobile station is transmitted to a base station through authentication and control management ID is transmitted to a mobile station.

The mobile station transmits initial information query to the femto cell base station S806. The mobile station transmits the initial information query to request network configuration information to the femto cell base station. The network configuration information is information of femto cell base stations which can which can serve the mobile station and exist around the mobile station.

In an embodiment of the present invention, media independent handover (MIH) which is defined in IEEE 802.21 will be described as query protocol used to acquiring network configuration information for example. But the present invention is not limited to it. And other query protocol can be used. A mobile station includes physical layer, MAC layer and network control management system (NCMS) which controls and manages the physical layer and the MAC layer. The NCMS comprises objects to controls and manages the physical layer and the MAC layer and is linked with the physical layer and the MAC layer through interface. And the NCMS includes MIH.

The MIH delivers information query including matters which a mobile station will ask a femto cell base station to the MAC layer. The MAC layer puts the information query into MAC container and transmits it to a network. The MAC container including information query is the initial information query. The initial information query comprises inquiry matters included in the information query which is delivered from MIH to the MAC layer. And it additionally comprises a code and a method of transmitting a response for the initial information query.

Generally a mobile station can request a base station to provide information after connection between a mobile station and a base station is completely establishes. Thus, it is exceptional that a mobile station requests a base station to provide information after initial ranging and basic service capability negotiation like an embodiment of the present invention. Accordingly, the initial information query comprises a code which indicates that the initial information query is an exceptional message.

And the mobile station request a method of transmitting a response for the initial information query to the femto cell base station. Accordingly, the initial information query comprises a method of transmitting a response for the initial information query. A method of transmitting a response for the initial information query can be unicase, multicase or broadcast.

The femto cell base station transmits an initial information query response to the mobile station S807. If the femto cell base station can transmit information of femto cell base stations which can serve the mobile station and exist around the mobile station immediately, the femto cell base station put the information of femto cell base stations into the initial information query response and transmits it. If the femto cell base station cannot transmit the information of femto cell base stations immediately, the femto cell base station puts cycle into the initial information query response, wherein the cycle is a time at which the information of femto cell base stations can be transmitted. The cycle superframe offset at which the information of femto cell base stations can be transmitted.

FIG. 8 shows a case that the initial information query response includes the cycle. In FIG. 8, the initial information query response includes the cycle, 2. It means that information query response including the information requested by the mobile station will be transmitted in second superframe from a next superframe.

Since a mobile station can request a plurality of queries, the initial information query response includes query ID to distinguish a plurality of queries.

The femto cell base station transmits a broadcast channel at a period of broadcast channel transmission S808. In case that there is a query which is received from a mobile station but not yet responded, a broadcast channel includes an initial query count and a query response indicator.

The initial query count is superframe offset on which information query response will be transmitted. In FIG. 8, that the initial query count is '1' means that information query response will be transmitted on a next superframe.

The query response indicator indicates whether the superframe includes information query response. In FIG. 8, that the query response indicator is 'off' means that the superframe does not include information query response.

The initial query count and the query response indicator can be used optionally. That is, all of the initial query count and the query response indicator can be used or, one of the initial query count and the query response indicator can be used.

The femto cell base station transmits a broadcast channel at a next period of broadcast channel transmission S809. In S809, the initial query count is 0 and the query response indicator is on. Superfame including the broadcast channel of S809 comprises an information query response.

If Superfame including a broadcast channel comprises an information query response, the broadcast channel includes frame offset or subframe offset. Frame offset is frame number on which the information query response will be transmitted and subframe offset is subframe number on which the information query response will be transmitted.

The femto cell base station transmits an information query response on frame which the frame offset point out or subframe which the subframe offset point out S810. The information query response an initial query request, an initial query response and a query ID.

The initial query request is the inquiry matter included in the initial information query which the mobile station transmits at S806. The initial query response is a response to the initial query request. Since the mobile station requests information of femto cell base stations which can serve the mobile station and exist around the mobile station at S806, the initial query response is the information of femto cell base stations which can serve the mobile station and exist around the mobile station. The information of femto cell base stations can include BS IDs and central frequency of frequency band of the femto cell base stations.

The femto cell base station can transmit the information query response several times S811, S812. As illustrated in FIG. 8, an initial query count is 0 and a query response indicator is on, wherein the initial query count and the query response indicator are included in broadcast channel of superframe which comprises information query response transmitted repeatedly. The mobile station can know that the information query response is transmitted repeatedly with query ID.

After transmitting the information query response repeatedly, the femto cell base station transmits a broadcast channel whose initial query count is 0 and query response indicator is off S813.

Figure 9:
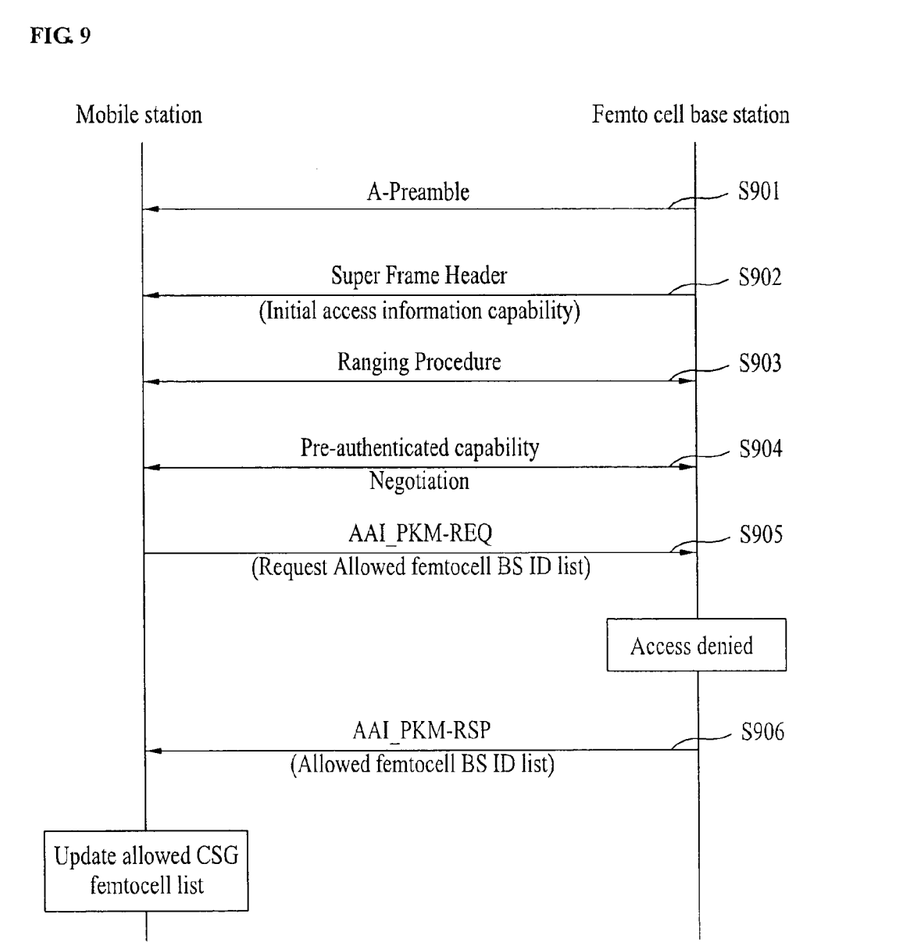
FIG. 9 illustrates procedure that a mobile station tries initial access according to an embodiment of the present invention.

Next, it will be described a process that a mobile station acquires information of femto cell base stations which can serve the mobile station and exist around the mobile station when there are not macro base station but femtocell base stations around a mobile station.

FIG. 9 illustrates procedure that a mobile station tries initial access according to an embodiment of the present invention.

As illustrated in FIG. 9, a mobile station receives a preamble and recognizes a base station to be a femtocell base station S901.

The mobile station checks BS ID and initial access information capability of the femto cell base station through superframe header (SFH) S902. The initial access information capability can be included in sub-packet (SP) 1 of SP 2 of SFH.

That the initial access information capability is 1 means that the femto cell base station can provides the mobile station with information of femto cell base stations which can serve the mobile station and exist around the mobile station if the mobile station fails network entry and requests the information of femto cell base stations. Or, even if the mobile station does not request the information of femto cell base stations, the femto cell base station provides the mobile station with the information of femto cell base stations through an advanced air interface privacy key management response (AAI_PKM-RSP) message or other MAC messages.

Since the mobile station trying initial access can not know whether the femto cell base station allows the mobile station to access to itself or not, the mobile station performs ranging and pre-authenticated capability negotiation to try network entry to the femto cell base station S903, S904.

The mobile station transmits an advanced air interface privacy key management request (AAI_PKM-REQ) message for authentication to the femto cell base station S905.

At this time, setting an initial access network information request bit, the mobile station requests that the femto cell base station transmits information of neighbor femto cell base stations which can serve the mobile station if the authentication is failed.

In FIG. 9, the authentication is failed and the mobile station fails to access the femto cell base station. Even though authentication through an AAA server successes, the authentication can be failed if authentication of the femto cell base station fails. It can be performed by a femtocell security gateway, an AAA server or a femtocell gateway.

The femto cell base station transmits an advanced air interface privacy key management response (AAI_PKM-RSP) message to the mobile station S906.

At this time, the femto cell base station can inform the mobile station of cause of authentication failure. For example, since the mobile station is not a member of the femto cell base station, the authentication fails.

The femto cell base station can provide the mobile station with information of femto cell base stations which can serve the mobile station and exist around the mobile station through the AAI_PKM-RSP message. Or, the femto cell base station can provide the mobile station with information of femto cell base stations through other messages.

The mobile station searches a femto cell base station for initial access based on the information of femto cell base stations received from the femto cell base station.

Figure 10:
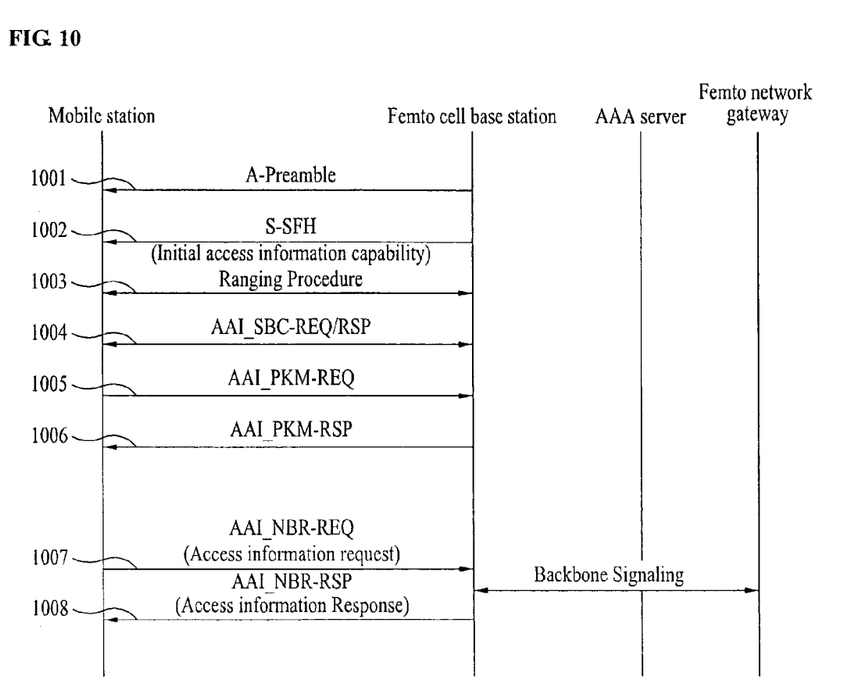
FIG. 10 illustrates procedure that a mobile station tries initial access according to another embodiment of the present invention.

FIG. 10 illustrates procedure that a mobile station tries initial access according to another embodiment of the present invention.

As illustrated in FIG. 10, a mobile station receives a preamble and recognizes a base station to be a femtocell base station S1001.

The mobile station checks BS ID and initial access information capability of the femto cell base station through superframe header (SFH) S1002. The initial access information capability can be included in sub-packet (SP) 1 of SP 2 of SFH.

That the initial access information capability is 1 means that the femto cell base station can provides the mobile station with information of femto cell base stations which can serve the mobile station and exist around the mobile station if the mobile station fails network entry and requests the information of femto cell base stations. Or, even if the mobile station does not request the information of femto cell base stations, the femto cell base station provides the mobile station with the information of femto cell base stations through an advanced air interface privacy key management response (AAI_PKM-RSP) message or other MAC messages.

Since the mobile station trying initial access can not know whether the femto cell base station allows the mobile station to access to itself or not, the mobile station performs ranging and pre-authenticated capability negotiation to try network entry to the femto cell base station S1003, S1004.

The mobile station transmits an advanced air interface privacy key management request (AAI_PKM-REQ) message for authentication to the femto cell base station S1005.

In FIG. 10, the authentication is failed and the mobile station fails to access the femto cell base station. It can be performed by, an AAA server or a femto network gateway.

The femto cell base station transmits an advanced air interface privacy key management response (AAI_PKM-RSP) message to the mobile station S1006.

If becoming aware that the authentication fails through the AAI_PKM-RSP message, the mobile station requests information of femto cell base stations which can serve the mobile station and exist around the mobile station through an advanced air interface neighbor request (AAI_NBR-REQ) message S1007.

Then the femto cell base station transmits information of femto cell base stations which can serve the mobile station and exist around the mobile station through an advanced air interface neighbor response (AAI_NBR-RSP) to the mobile station S1008.

Figure 11:
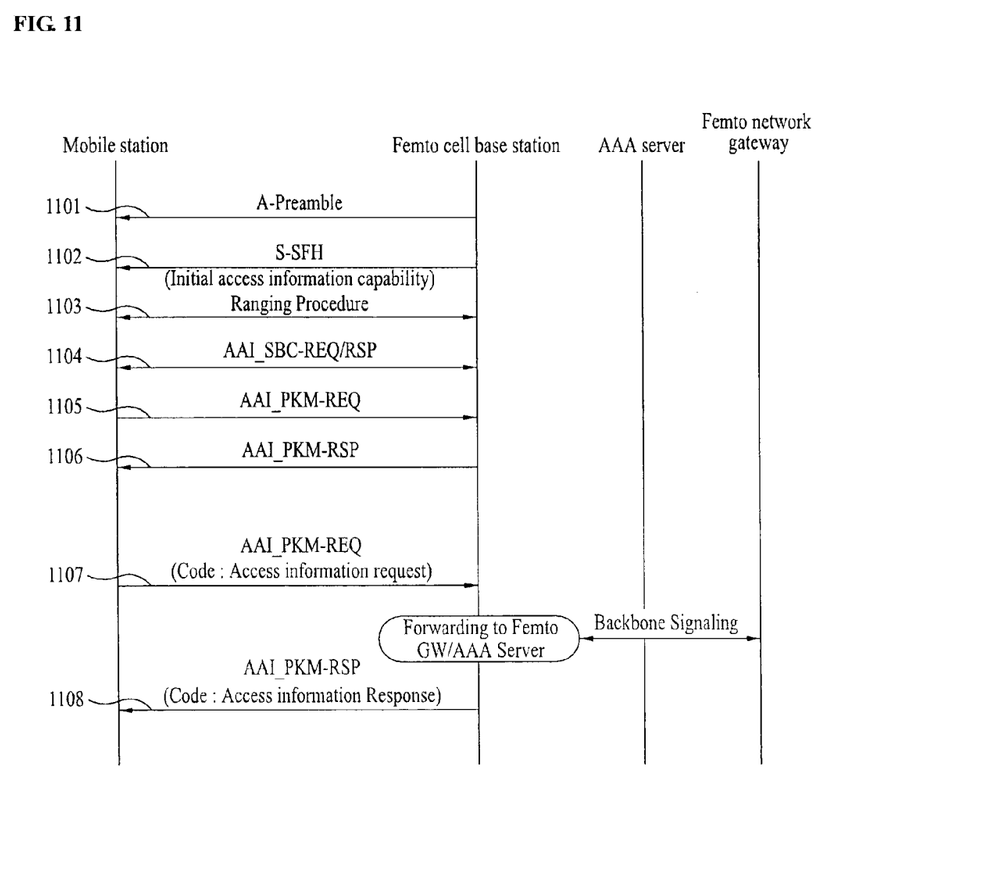
FIG. 11 illustrates procedure that a mobile station tries initial access according to another embodiment of the present invention.

FIG. 11 illustrates procedure that a mobile station tries initial access according to another embodiment of the present invention.

As illustrated in FIG. 11, a mobile station receives a preamble and recognizes a base station to be a femtocell base station S1101.

The mobile station checks BS ID and initial access information capability of the femto cell base station through superframe header (SFH) S1102.

That the initial access information capability is 1 means that the femto cell base station can provides the mobile station with information of femto cell base stations which can serve the mobile station and exist around the mobile station if the mobile station fails network entry and requests the information of femto cell base stations. Or, even if the mobile station does not request the information of femto cell base stations, the femto cell base station provides the mobile station with the information of femto cell base stations through an advanced air interface privacy key management response (AAI_PKM-RSP) message or other MAC messages.

Since the mobile station trying initial access can not know whether the femto cell base station allows the mobile station to access to itself or not, the mobile station performs ranging and pre-authenticated capability negotiation to try network entry to the femto cell base station S1103, S1104.

The mobile station transmits an advanced air interface privacy key management request (AAI_PKM-REQ) message for authentication to the femto cell base station S1105.

In FIG. 11, the authentication is failed and the mobile station fails to access the femto cell base station. It can be performed by, an AAA server or a femto network gateway.

The femto cell base station transmits an advanced air interface privacy key management response (AAI_PKM-RSP) message to the mobile station S1106.

If becoming aware that the authentication fails through the AAI_PKM-RSP message, the mobile station requests information of femto cell base stations which can serve the mobile station and exist around the mobile station through an AAI_PKM-REQ message S1107. The AAI_PKM-REQ message includes a PKM code indicating that the mobile station requests information of femto cell base stations which can serve the mobile station and exist around the mobile station.

Then, the femto cell base station forwards the AAI_PKM-REQ message to a femto network gateway or an AAA server, and receives information of femto cell base stations which can serve the mobile station and exist around the mobile station from the femto network gateway or the AAA server.

The femto cell base station transmits information of femto cell base stations which can serve the mobile station and exist around the mobile station to the mobile station through an AAI_PKM-RSP message S1108. The AAI_PKM-RSP message includes a PKM code indicating that the AAI_PKM-RSP message includes information of femto cell base stations which can serve the mobile station and exist around the mobile station.

It is described in embodiments of the present invention that a mobile station requests information of femto cell base stations which can serve the mobile station and exist around the mobile station through an AAI_NBR-REQ message or an AAI_PKM-REQ message and the femto cell base station provides the mobile station with the information of femto cell base stations through an AAI_NBR-RSP message or an AAI_PKM-RSP message. But, the present invention is not limited to it. The mobile station can request information of femto cell base stations through other messages and the femto cell base station can provide the information of femto cell base station through other messages. For example, The mobile station can request information of femto cell base stations through an AAI_REG-REQ RSP message and the femto cell base station can provide the information of femto cell base station through an AAI_REG-RSP message.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are contained in the scope of the present invention.

It is apparent that the present invention may be embodied by a combination of claims which do not have an explicit cited relation in the appended claims or may include new claims by amendment after application.

The invention claimed is:

1. A method of performing an initial access at a mobile station (MS) in a wireless communication system, the method comprising:
   requesting a neighbor femto base stations (BSs) list from a selected BS;
   receiving the neighbor femto BSs list from the selected BS after requesting the neighbor femto BSs list;
   scanning neighbor femto BSs based on the neighbor femto BSs list;
   selecting a femto BS for initial access based on a result of the scanning; and
   performing the initial access to the selected femto BS.

2. The method according to claim 1, wherein the selected BS is a femto BS or a macro BS.

3. The method according to claim 2, wherein the MS selects a femto BS as the base station from which the MS requests the neighbor femto BSs list responsive to both the femto BS and a macro BS being able to send the neighbor femto BSs list to the MS through a scanning downlink channel.

4. The method according to claim 1, wherein:
   the selected BS is selected by receiving broadcast channels from each neighbor femto BS; and
   each of the broadcast channels indicates whether the corresponding neighbor femto BS can transmit the neighbor femto BSs list.

5. The method according to claim 1, wherein requesting the neighbor femto BSs list comprises transmitting a query to request the neighbor femto BSs list to the selected BS.

6. The method according to claim 1, wherein the neighbor femto BSs list is received through a broadcast message from the selected BS.

7. A method of performing initial access at a mobile station (MS) in a wireless communication system, the method comprising:
   requesting a femto base station (BS) to transmit information of neighbor femto BSs which can serve the MS after authentication to the femto BS fails; and
   receiving the information of the neighbor femto BSs,
   wherein receiving the information comprises receiving the information through an advanced air interface privacy key management response (AAI-PKM-RSP) message.

8. A method of performing initial access at a mobile station (MS) in a wireless communication system, the method comprising:
   performing authentication with a femto base station (BS);
   requesting, from the femto BS, information of neighbor femto BSs which can serve the MS, responsive to failure of the authentication; and receiving the information of the neighbor femto BSs,
wherein receiving the information comprises receiving the information through an advanced air interface neighbor response (AAI-NBR-RSP) message.

9. A method of performing a network entry at a mobile station (MS) in a wireless communication system, the method comprising:
- transmitting, to a serving base station (BS), a message including a preamble index of at least one femto BS detected by the MS through scanning;
- receiving, from the serving BS, a list of at least one neighbor accessible femto BS in response to the message,
- wherein the list of at least one neighbor accessible femto BS is based on the preamble index of the detected at least one femto BS; and
- performing the network entry with a neighbor femto BS of the at least one neighbor accessible femto BS.

10. The method of claim 9, wherein the serving BS is a macro BS or a femto BS.

11. A mobile station (MS) for performing a network entry in a wireless communication system, the MS comprising:
- a transmitter configured to transmit, to a serving base station (BS), a message including a preamble index of at least one femto BS detected by the MS through scanning;
- a receiver configured to receive, from the serving BS, a list of at least one neighbor accessible femto BS in response to the message,
- wherein the list of at least one neighbor accessible femto BS is based on the preamble index of the detected at least one femto BS; and
- a processor configured to perform the network entry with a neighbor femto BS of the at least one neighbor accessible femto BS.

12. A method of performing a network entry at a mobile station (MS) in a wireless communication system, the method comprising:
- transmitting, to a serving base station (BS), a message including a preamble index of at least one femto BS detected by the MS through scanning;
- receiving, from the serving BS, a list of at least one neighbor accessible femto BS in response to the message,
- wherein the list of at least one neighbor accessible femto BS is based on the preamble index of the detected at least one femto BS;
- scanning based on the list of at least one neighbor accessible femto BS; and
- performing the network entry with a neighbor femto BS of the at least one neighbor accessible femto BS based on a result of the scanning.

13. A mobile station (MS) for performing a network entry in a wireless communication system, the MS comprising:
- a transmitter configured to transmit, to a serving base station (BS), a message including a preamble index of at least one femto BS detected by the MS through scanning;
- a receiver configured to receive, from the serving BS, a list of at least one neighbor accessible femto BS in response to the message,
- wherein the list of at least one neighbor accessible femto BS is based on the preamble index of the detected at least one femto BS; and
- a processor configured to:
  - scan based on the list of at least one neighbor accessible femto BS; and
  - perform the network entry with a neighbor femto BS of the at least one neighbor accessible femto BS based on a result of the scan.

* * * * *